United States Patent [19]
Fleming-Dahl

[11] Patent Number: 5,436,846
[45] Date of Patent: Jul. 25, 1995

[54] METHOD OF FACILITATING CONSTRUCTION OF A MICROWAVE SYSTEM BY APPROPRIATE MEASUREMENTS OR DETERMINATION OF PARAMETERS OF SELECTED INDIVIDUAL MICROWAVE COMPONENTS TO OBTAIN OVERALL SYSTEM POWER RESPONSE

[75] Inventor: Arthur Fleming-Dahl, Miller Place, N.Y.

[73] Assignee: Grumman Aerospace Corporation, Bethpage, N.Y.

[21] Appl. No.: 253,597

[22] Filed: Jun. 3, 1994

Related U.S. Application Data

[63] Continuation of Ser. No. 72,685, Jun. 7, 1993, abandoned, which is a continuation of Ser. No. 529,615, May 29, 1990, abandoned.

[51] Int. Cl.$^6$ ............................................. G06F 17/50
[52] U.S. Cl. .................................. 364/481; 364/483; 364/578; 324/638
[58] Field of Search ............... 364/578, 580, 481, 483; 324/637, 638, 76.19

[56] References Cited

U.S. PATENT DOCUMENTS

| | | | |
|---|---|---|---|
| 3,796,948 | 3/1974 | Wentworth | 324/638 |
| 3,904,959 | 9/1975 | Britton, Jr. | 324/637 |
| 4,045,730 | 8/1977 | Singer et al. | 324/76 R |
| 4,263,653 | 4/1981 | Mecklenburg | 364/483 |
| 4,521,728 | 6/1985 | Li | 324/638 |
| 4,584,650 | 4/1986 | Kozuch | 364/481 |
| 4,812,738 | 3/1989 | Itaya et al. | 324/638 |
| 4,853,613 | 8/1989 | Sequeira et al. | 324/638 |
| 4,901,260 | 2/1990 | Lubachevsky | 364/578 |
| 4,958,294 | 9/1990 | Herscher et al. | 324/637 |

OTHER PUBLICATIONS

Moreno, *Microwave Transmission Data*, pp. 28–31, 1958.

*Primary Examiner*—Emanuel T. Voeltz
*Assistant Examiner*—Kyle J. Choi
*Attorney, Agent, or Firm*—Bacon & Thomas

[57] ABSTRACT

A method of facilitating construction of a microwave system which permits the evaluation of a variety of hardware construction options and subsequent evaluation of their effectiveness by measuring or otherwise determining appropriate physical parameters of selected components arranged in a selected order to predict the power response uses an iterative ladder network constructed according to a point discontinuity model for individual components of the system in which input and output reflection coefficients and an attenuation coefficient are calculated for each component based on measured or specified insertion loss and VSWR or return loss values, and the ladder is analyzed by processing the coefficients forward in the direction of power flow.

31 Claims, 9 Drawing Sheets

METHOD OF FACILITATING CONSTRUCTION OF A MICROWAVE SYSTEM BY APPROPRIATE MEASUREMENTS OR DETERMINATION OF PARAMETERS OF SELECTED INDIVIDUAL MICROWAVE COMPONENTS TO OBTAIN OVERALL SYSTEM POWER RESPONSE

This application is a continuation of application Ser. No. 08/072,685, filed Jun. 7, 1993

BACKGROUND OF THE INVENTION

1. Field of the Invention

This invention relates to microwave system analysis, and in particular to a method of determining the power response of a microwave system.

2. Description of the Related Art

Microwave components and systems are specified in terms of their power or voltage responses. Since power is equal to voltage squared divided by impedance, the power response is related to the square of the voltage response. Insertion loss (IL), return loss (RL), and voltage standing wave ratio (VSWR) are useful indications of the power response of microwave components and systems.

The voltage standing wave ratio is a measure of the amount of power reflected from a device or load, relative to the amount of power incident on the device. It is therefore a purely dimensionless number. The return loss is the dimensionless ratio of reflected to incident power, usually expressed in decibels.

On the other hand, insertion loss is a dimensionless ratio, usually expressed in decibels, of the amount of power that can continue to the circuitry that follows the device, relative to the amount of power incident on the device. The insertion loss measures, in addition to the reflection loss effect represented by the voltage standing wave ratio, the effect of heat loss under normal conditions. Also included in the insertion loss are losses due to radiation, coupling, leakage, cross talk, propagation mode transformation (moding) and so forth; each of which is, however, totally controlled under normal circumstances.

Each microwave system has a unique insertion loss and voltage standing wave ratio, which is determined by both the microwave response characteristics of the individual components in the system and the manner in which these components are interconnected. However, for systems consisting of multiple diverse components, the voltage calculations conventionally used to predict the VSWR response rapidly become intractable, and the margins of error between predicted response and observed response increase greatly because the worst-case combination of voltages is not normally seen on the system level.

One such VSWR method is the graphical or mathematical implementation of the Smith Chart. This technique begins with a load impedance, and processes the complex impedance and electrical length of a microwave system's components back through the system to predict the worst-case voltage combination of reflections. There are several limitations to use of this technique. First, the system components are normally specified in terms of insertion loss and VSWR, not complex impedance and electrical length. Second, complex impedance and electrical length are not derivable from insertion loss and VSWR specifications. Third, complex impedance and electrical length, if known, vary tremendously with frequency; so this technique is a reasonable approach for narrowband systems, but tedious even for computers for bandwidths beyond a decade. Attenuation, if known, can be accounted for, but it also varies greatly with frequency and complicates the process even further.

An alternative VSWR response analysis technique begins with a load reflection, proceeds back through the system operating on voltage values independently of phase considerations, and results in the worst-case voltage combination of reflections. The equations necessary to implement this technique are found in Moreno, *Microwave Transmission Design Data*, Dover Publications Inc., N.Y., N.Y., 1958. Moreno's equations apply directly to the situation of two reflection points in intimate contact, and do not account for the existence of an attenuation element between reflection points. Furthermore, Moreno lists only the equations, and does not present a treatise on the technique required to implement them on a system level.

For transmitted power, the conventional method of analysis is to add the insertion loss values in decibels of the system components in order to find the insertion loss of the system. This known technique inherently ignores the possibility of a worst-case voltage combination of reflections because it operates on power values rather than voltage values.

The insertion loss addition technique assumes that the components will operate independently, without appreciable mutual interactions, when assembled into the system configuration. The value returned by this approach is not influenced by the direction of power flow, and predicts the system's most likely insertion loss. Under normal conditions, the technique of adding component insertion loss values is reasonably accurate because the worst case combination of voltages is not usually seen on a system level.

Because both VSWR techniques process the combination of voltages, the resultant value is not congruous with the technique used for insertion loss, which processes the combination of power. A set of system response parameters for insertion loss and VSWR that are calculated via the conventional techniques are therefore not consistent with each other, and do not present a basis from which to draw conclusions on the acceptability of measured data.

Additionally, both VSWR techniques start at the load, and proceed backward through the circuit with respect to the direction of power flow. Such a technique does not provide an intuitive feel for the design of system circuits because design normally proceeds in the same direction as the flow of power.

From the standpoint of system specifications, both VSWR techniques require knowledge of a load. This means that a system manufacturer must either have a priori knowledge of the user's setups in order to specify the system, or tie the system specification to a variety of load conditions, because the conventional calculations intrinsically depend on the load's characteristics. It is much more desirable to specify a system independently of any external equipment, and without knowledge of its intended use.

Each of the two conventional microwave system analysis methods for finding the worst case voltage combination of reflections is relatively difficult to implement. Both are inadequate in that neither method enables calculation of the worst-case power combination of reflections, which represents the VSWR most likely to be exhibited by a system. The technique of adding component insertion losses represents the power transmission characteristic most likely to be exhibited by a system. The VSWR values and insertion loss values arrived at via these conventional methods are therefore not mutually consistent.

SUMMARY OF THE INVENTION

It is an objective of the invention to provide a method for analyzing a microwave system which will yield mutually consistent values for the insertion loss and the voltage standing wave ratio or return loss of the system, as well as heat losses, based solely on knowledge of the insertion loss and voltage standing wave ratio performance of the individual constituent components of the system.

It is a second objective of the invention to provide a method for analyzing a microwave system which, by yielding a value for the insertion loss of an unterminated circuit that is consistent with the conventional insertion loss technique, maintains the industry standard for insertion loss analysis; by enabling the evaluation of system reflection for an unterminated circuit, permits the specification of a microwave system without knowledge of its intended use or reference to the load; by ensuring that the insertion loss and VSWR values found for an unterminated circuit are mutually consistent, presents a basis from which to evaluate the acceptability of the measured system data; and by proceeding through the circuit in the direction of power flow, confers an intuitive feel for system design.

It is a third objective of the invention to provide a method for analyzing a microwave system which, if implemented with the worst-case specifications of the components, determines the system's expected worst case power response; and which, if implemented with the most probable response of the components, determines the system's most probable power response.

It is a fourth objective of the invention to provide a method for analyzing a microwave system which permits the evaluation of a variety of hardware construction options and measurement technique options by calculation, prior to their implementation, and which provides a basis for the subsequent empirical evaluation of their effectiveness.

These objectives are achieved by providing a method for determining the power response of a microwave system which is based upon a point discontinuity model for the individual components of the system, derives an input and an output reflection coefficient and an attenuation coefficient for each component of the system, and constructs a ladder network in order to enable the use of an iterative calculation procedure which can be easily implemented on a computer to process the system response parameters.

After deriving the input and output reflection coefficients and the attenuation coefficients for all components, artificial attenuation elements whose value equals 1 are inserted between juxtaposed reflection elements of contiguous system components in order to create the ladder network. The system's transmission, reflection, and loss coefficients are calculated by iterating through the segments of the ladder network in sequence, with each segment containing one reflection and one attenuation point discontinuity, starting from the system input, and proceeding in the direction of power flow.

In both the "most probable" and "worst case" analyses, the individual parameters are combined as power values. Unlike previous methods of reflection analysis, instead of combining voltages in the worst case, on the system level the worst case combination of power is used. Thus, the constituent component voltage parameters are analyzed within the context of a root sum square (RSS) analysis, which is also the concept embodied in the technique of adding component insertion loss values to get a system insertion loss.

DETAILED DESCRIPTION OF THE PREFERRED EMBODIMENTS

This description includes six sections. The first describes the basic model upon which the method is based. The second describes the first step of the invention, which is the derivation of reflection and loss coefficients for individual components of the system. The third describes a calculation variation for components differing only in their length or attenuation values. The fourth describes the iterative calculation procedure for deriving system power response values. The fifth describes an equation correction term and the sixth a computer implementation.

Figure 1:
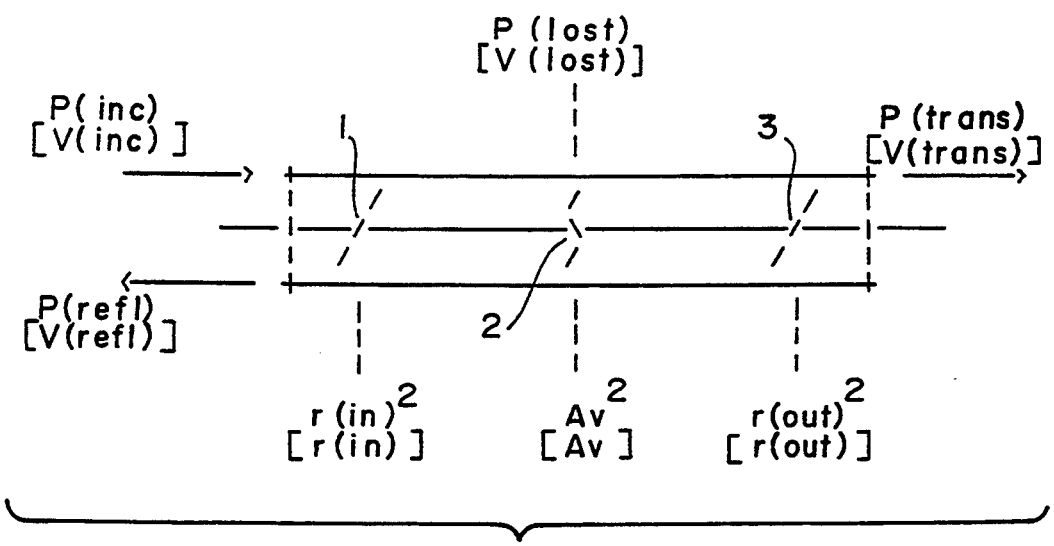
FIG. 1 depicts a model of a microwave device containing three point discontinuities. Discontinuity number one is the input reflection, number two is the attenuation, and number three is the output reflection.

I. Representation of a Microwave Component in Terms of Point Discontinuities As shown in FIG. 1, each microwave device can be modeled as a combination of point discontinuities in the path of power flow. The microwave device can be thought of as being made up of three elements, an input reflection element 1, an attenuation element 2, and an output reflection element 3. The "attenuation" element 2 may, of course, also be a gain element with a corresponding reverse isolation.

It will be appreciated that the model shown in FIG. 1 is in general viable for any microwave system made up of components with identical nominal impedance, such as cables, switches, and attenuators.

Three things can happen to power incident on a device. It can be (1) reflected, (2) transmitted, or (3) lost to heat, radiation, coupling, moding, and the like. FIG. 1 indicates both voltage and power variables V and P for the three cases, reflection, transmittance, and loss, as well as the incident power, with power values open and voltage values bracketed.

The total amount of voltage reflected from the device is represented in terms of a total reflection factor R by the formula $$V(refl) = R*V(inc), \quad (1)$$

while the power reflected depends on the square of the reflection factor R:

$$P(refl) = R^2*P(inc). \quad (2)$$

Similarly, transmission is represented by the formulas $$V(trans) = T*V(inc) \quad (3)$$

$$P(trans) = T^2*P(inc). \quad (4)$$

Finally, the losses may be represented by the formulas $$V(lost) = L*V(inc) \quad (5)$$

$$P(lost) = L^2*P(inc). \quad (6)$$

The response factors R, T, and L are a function of coefficients r(in), Av, and r(out), which represent the contributions of each of the point discontinuities 1, 2, and 3 as shown in FIG. 1. Each coefficient is squared in the case of power.

For example, in the first order, the transmission factor T is made up of a term which represents the amount of incident power minus the amount of power reflected upon incidence (1-r(in)$^2$). This term is multiplied by the contribution of the attenuation element Av$^2$. Finally, the amount of power transmitted is this value reduced by the amount of power reflected at the output reflection discontinuity, i.e., by a factor of (1-r(in)$^2$)Av$^2$ multiplied by the output reflection coefficient r(out)$^2$. Thus, the reduction of incident power caused by the presence of the device may be represented by the formula $$\begin{aligned} T^2 P(inc) &= (P(inc) - P(inc)r(in)^2)Av^2 - \\ &\quad (P(inc) - P(inc)r(in)^2)Av^2 r(out)^2 \\ &= P(inc)(1 - r(in)^2)Av^2(1 - r(out)^2), \end{aligned}$$

which implies that $$T^2 = (1 - r(in)^2)Av^2(1 - r(out)^2). \quad (7)$$

It will be appreciated, however, that the reflection and transmission of power at the point discontinuities does not stop at the first order. A portion of the power initially reflected from the output point discontinuity 3 ((1-r(in)$^2$)Av$^2$r(out)$^2$) will be reflected back at the input point discontinuity 1, and subsequently reflected and transmitted at the output point discontinuity 3. A portion of the subsequently reflected power will then be reflected and transmitted at the input point discontinuity 1, and so forth.

Thus, an infinite order analysis is required, accounting for the infinitely many reflections bouncing back and forth between the two reflection points 1 and 3, each time being operated on at the attenuation discontinuity 2. The infinite order analysis gives the exact equation for the transmission coefficient:

$$T^2 = \frac{(1 - r(in)^2)Av^2(1 - r(out)^2)}{1 - r(in)^2 r(out)^2 Av^4} \quad (8)$$

A similar analysis gives the reflection coefficient R$^2$ in the first order and the infinite order. The amount r(in)$^2$ reflected initially by the input point discontinuity is added to the amount reflected at the output (1-r(in)$^2$)Av$^2$r(out)$^2$ and multiplied by the attenuation on the way back to the input, Av$^2$ minus the amount of the second term resulting from reflection at the input (1-r(in)$^2$)Av$^4$r(out)$^2$r(in)$^2$). The equation for the first order reflection power coefficient therefore reduces to $$R^2 = r(in)^2 + (1 - r(in)^2)^2 r(out)^2 Av^4 \quad (9)$$

As with the transmission power operator T$^2$, the amount of power reflected at the input includes higher order contributions from components of the power which bounce back and forth between the two reflection point discontinuities before being transmitted out, resulting in the following infinite order equation for the reflection coefficient:

$$R^2 = r(in)^2 + \frac{(1 - r(in)^2)^2 Av^4 r(out)^2}{1 - r(in)^2 r(out)^2 Av^4}. \quad (10)$$

The loss coefficient can be calculated in essentially the same manner, the power loss coefficient in the first order being given by the formula $$L^2 = (1 - r(in)^2)(1 - Av^2)(1 + r(out)^2 Av^2) + (1 - r(in)^2) r(in)^2 r(out)^2 Av^4, \quad (11)$$

and the infinite order power loss coefficient by the formula $$L^2 = \frac{(1 - r(in)^2)(1 - Av^2)(1 + r(out)^2 Av^2)}{1 - r(in)^2 r(out)^2 Av^4}. \quad (12)$$

It will be noted that conservation of power dictates that P(refl)+P(lost)+P(trans)=P(inc), and that therefore R$^2$+T$^2$+L$^2$=1 must always apply for all equations everywhere in the analysis.

Equations (8), (10), and (12), together with the conservation of power principle, form the basis for the determination of the coefficient values for the point discontinuity model used in the method of system analysis described below.

II. Reduction of Measurement or Specification Data to Reflection and Attenuation Coefficients For Individual Components At this point in the analysis, an assumption is necessary in order to maintain tractability. The assumption is that r(in) equals r(out) for each individual component.

While this assumption loses track of the spatial distribution of high and low reflection points within asymmetrical components, i.e., in components wherein r(in) does not equal r(out), it preserves the overall results involving the interaction of reflections from the standpoint of power, affording a degree of simplicity in the reduction of either measured data or specification data to equivalent circuit values without compromising the final results.

By setting r(in)=r(out)=r, equations 8, 10, and 12 reduce to:

$$T^2 = \frac{(1-r^2)^2 Av^2}{1 - r^4 Av^4} \quad (13)$$

$$R^2 = r^2 * \left(1 + \frac{(1-r^2)^2 Av^4}{1 - r^4 Av^4}\right) \quad (14)$$

$$L^2 = \frac{(1-r^2)(1-Av^2)(1+r^2Av^2)}{1 - r^4 Av^4}. \quad (15)$$

Figure 5:
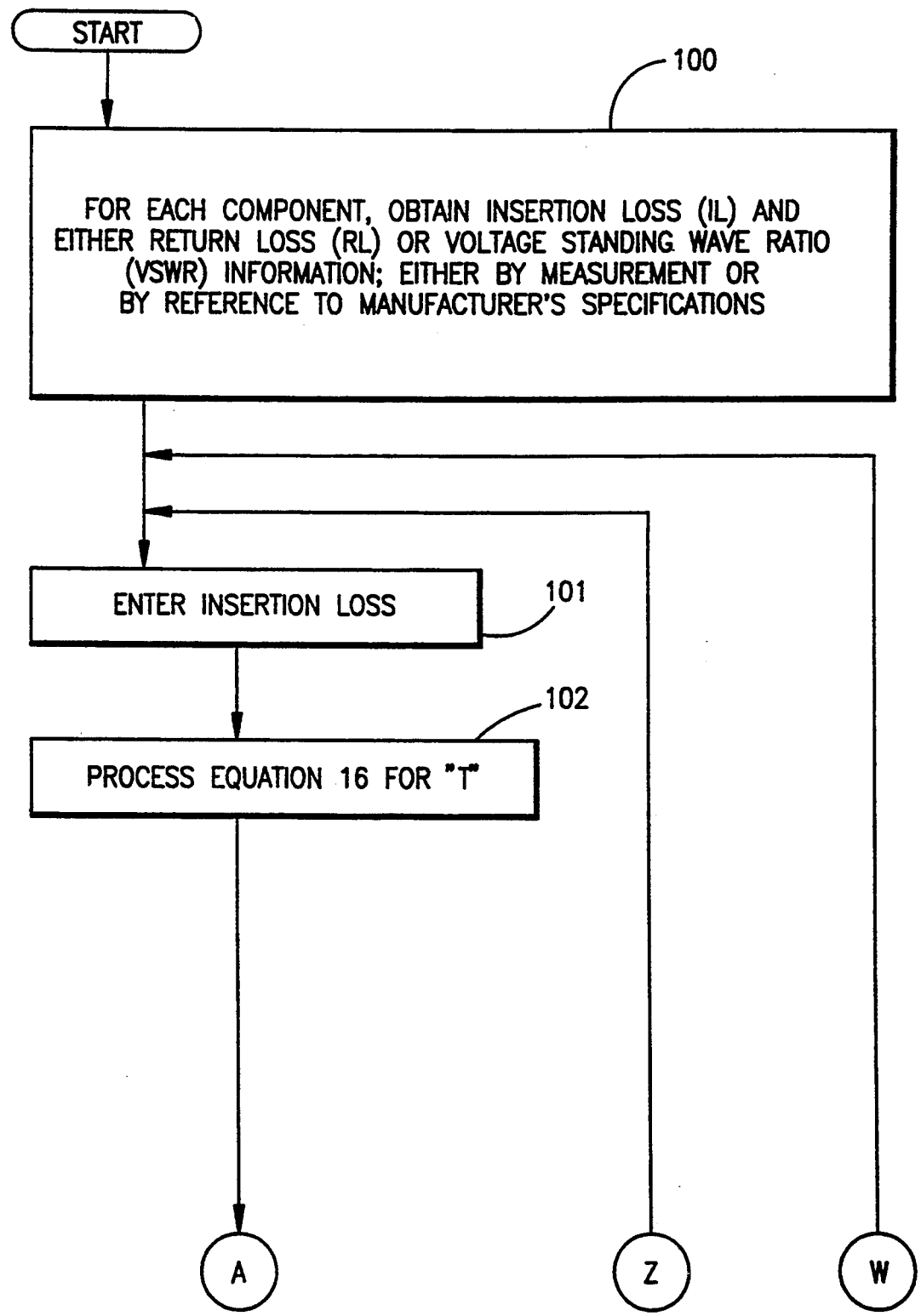
FIGS. 5–11 are flowcharts illustrating a method of determining the power response of a microwave system according to preferred embodiments of the invention.
Figure 6:
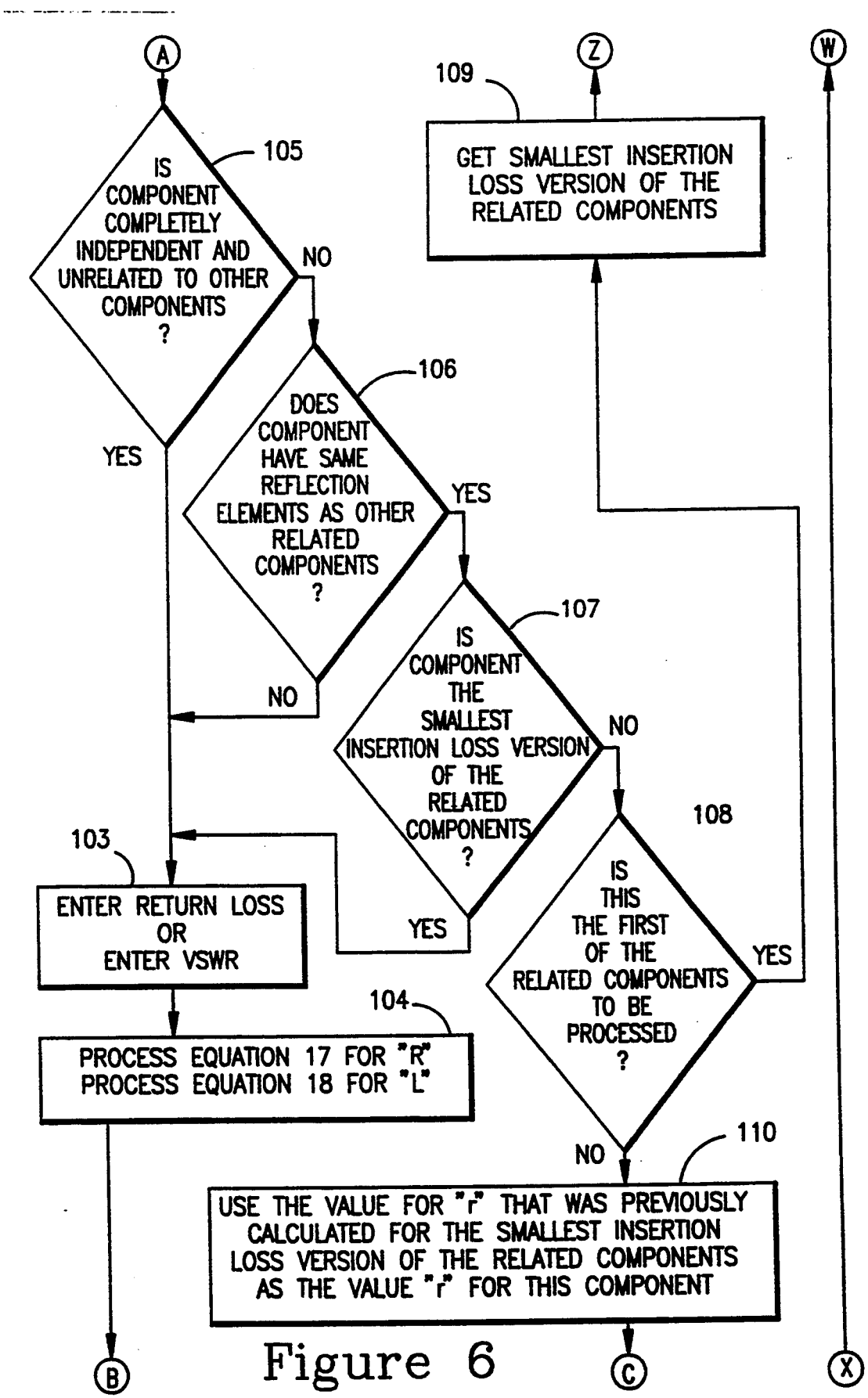

In order to construct a ladder network, as will be described in section IV of this description, the coefficients r and Av must be obtained for each component. This is accomplished by rewriting equations (13)–(15) to obtain r and Av as functions of T, R, and L; and by writing T, R, and L as functions of the insertion loss (IL) and return loss (RL) or voltage standing wave ratio (VSWR), which are directly measurable quantities, and the worst-case values of which are specified by the manufacturer of the individual component. FIGS. 5 and 6, steps 100–104, illustrate the manner in which the insertion loss and voltage standing wave ratio or return loss are processed using the following equations.

By definition, the insertion loss IL equals $10 \log_{10} T$. Thus, $$T = 10^{IL/20}. \quad (16)$$

Similarly, the reflection factor can be expressed as a function of the VSWR or RL:

$$R = \frac{VSWR - 1}{VSWR + 1} = 10^{RL/20}. \quad (17)$$

Finally, the loss factor can be expressed as $$L = SQRT(1 - (T^2 + R^2)), \quad (18)$$

which is the conservation of power equation.

Solving for $Av^2$ as a function of r and L in equation (15) results in the following equation:

$$Av^2 = \frac{1 - r^2 - L^2}{1 - r^2 - r^2 L^2}, \quad (19)$$

while $r^2$ can be expressed in terms of R, T, and L using equations 13, 14, 15, and 18, as follows:

$$r^2 = \frac{(2 - 2L^2T^2 - L^4) - SQRT((2 - 2L^2T^2 - L^4)^2 - 4R^2(2 - R^2))}{2(2 - R^2)}. \quad (20)$$

These equations may be used to determine Av and r by first solving for r using equation (20), then using this result to help evaluate Av in equation (19).

An alternative set of equations to determine Av and r is listed below.

$$r^2 = \frac{1 - Av^2 - L^2}{1 - Av^2 - Av^2 L^2} \quad (21)$$

$$Av^2 = \frac{(2L^2T^2 + L^4) - SQRT((2L^2T^2 + L^4)^2 + 4T^4)}{-2T^2} \quad (22)$$

Figure 7:
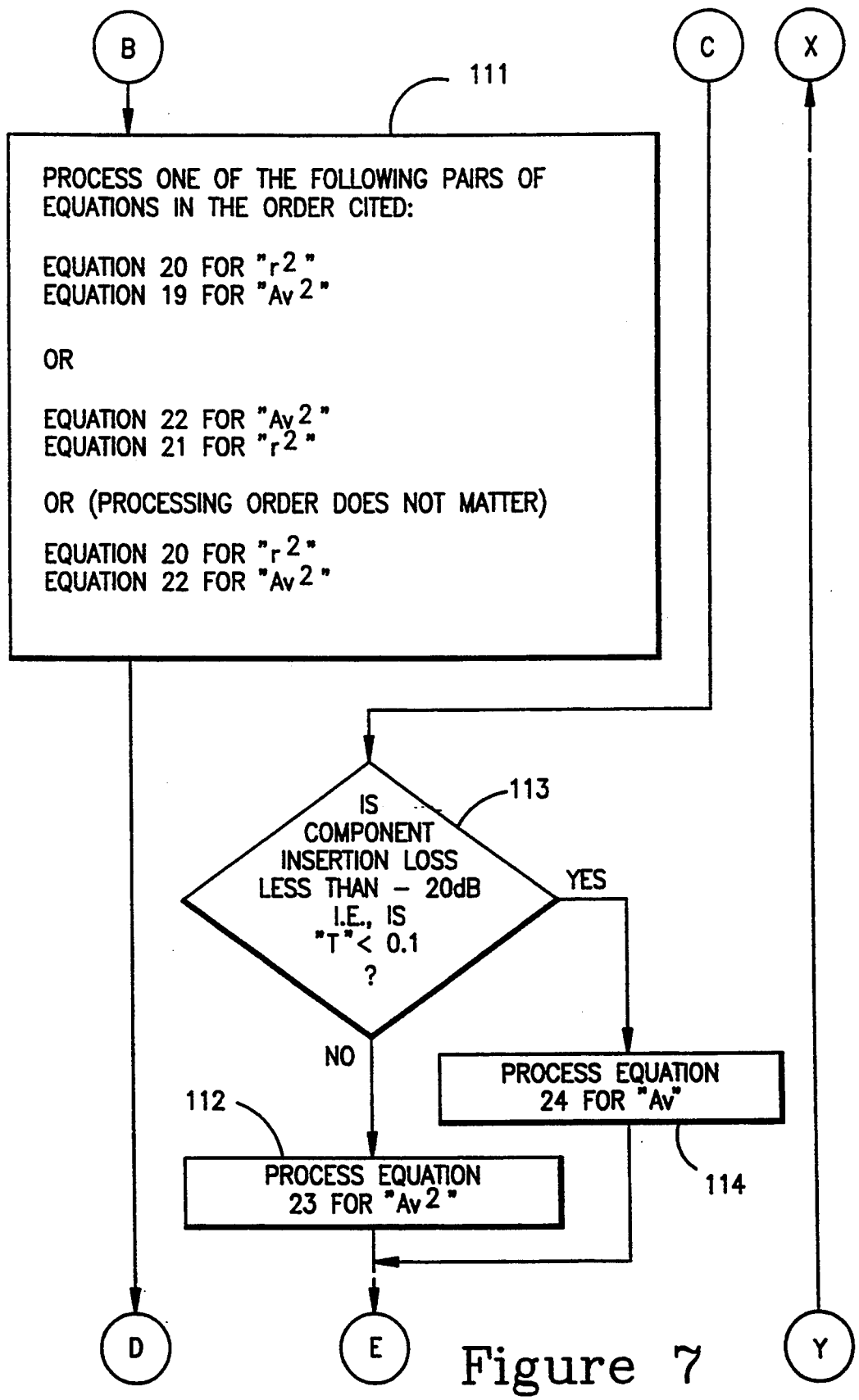

For this set of equations, first solve for Av using equation (22), then use this result to help evaluate r in equation (21). Both alternatives are illustrated in FIG. 7 by step 111.

Of course, equations (20) and (22) may be used to evaluate r and Av without using any particular sequence because both expressions contain only independent, known variables R, T, and L; but using one of the sequences outlined above significantly simplifies the calculation of one of the two desired variables. A simpler calculation translates into faster variable determination because fewer mathematical operations, especially the powers and square root, are encountered in process. A simpler equation additionally represents shorter, simpler programming code for computer implementation, which is of particular importance in applications utilizing limited-memory machines such as calculators.

III. Adjustment for Like Components Having Different Attenuation Values or Lengths For the special situations of different cable lengths and different value attenuators, the calculated value r will vary. Since this does not reflect reality because the input and output reflection coefficients for components which differ only in their length or attenuation factor are essentially constant, one should utilize the following technique:

First, the insertion loss and return loss or VSWR specifications should be processed as outlined above for the lowest loss version of the component (shortest cable and smallest attenuation), as indicated by steps 105–110 in FIG. 6.

Second, because the value r does not change even though the value T changes, Av should be calculated as a function of r and T via equation (13), which is solved for $Av^2$ as follows (step 112, shown in FIG. 7):

$$Av^2 = \frac{-(1-r^2)^2 + SQRT((1-r^2)^4 + 4r^4T^4)}{2r^4T^2}. \quad (23)$$

If the value of T is very small, for example less than 0.1, corresponding to a −20 decibel insertion loss, then the term $4r^4T^4$ in equation (23) will be very small and the numerator in the equation may erroneously evaluate to zero due to calculation inaccuracies (truncation, binary representation of a decimal number, and so forth), in which case the first order equation given by equation (7), and setting r(in)=r(out)=r, should be used to calculate Av as follows (steps 113 and 114, shown in FIG. 7):

$$Av = \frac{T}{1 - r^2} \quad (24)$$

Equation (24) accounts for the fact that, in a power analysis, a 20 decibel or larger attenuator provides essentially perfect isolation between the power reflected at its input and the power reflected at or after its output.

IV. Construction of Ladder Networks for Iteration Procedure

Figure 2:
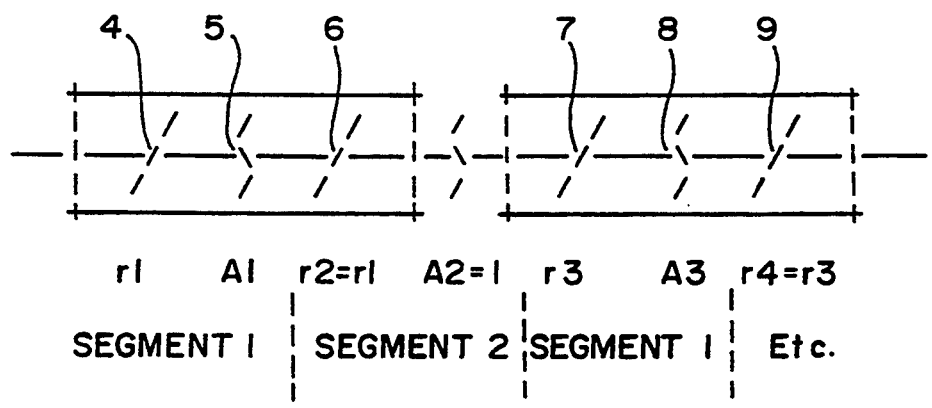
FIG. 2 illustrates the manner in which two microwave devices are combined, including the introduction of an attenuation element whose value is equal to 1 between juxtaposed reflection elements of contiguous devices.

FIG. 2 illustrates a model of two circuit components, including respective point discontinuity reflection coefficients r1–r4, and attenuation coefficients A1 and A3. Conventionally, the insertion losses for each component would be added in dB, and the worst case voltage combination of reflections would be calculated to predict the VSWR for the system.

The present invention begins construction of a ladder network for the purpose of enabling the use of an iterative calculation technique by introducing an attenuation element A2 whose value is 1 (no attenuation) between output 6 and input 7. This is done for all similarly juxtaposed reflection elements of contiguous system components.

Also, the assumption that the input and output reflection coefficients are equal for each of the system components is maintained, i.e., r1=r2 and r3=r4.

Figure 8:
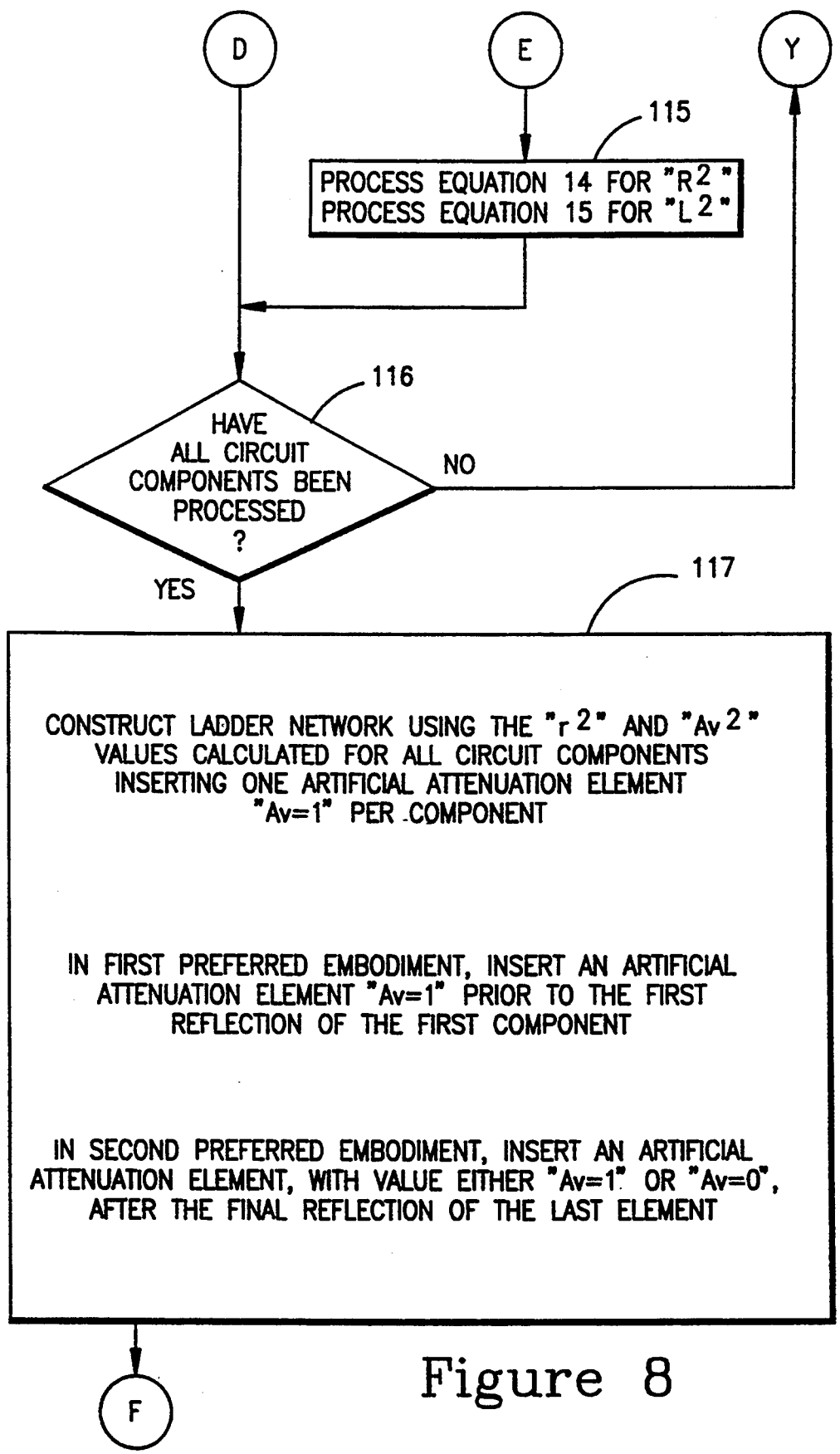

In order to complete the construction of the ladder network, it is necessary to introduce another attenuation element either at the beginning of the circuit or at the end of the circuit (step 117, shown in FIG. 8). Both variations will be described below, although the preferred placement is at the end of the circuit.

Figure 9:
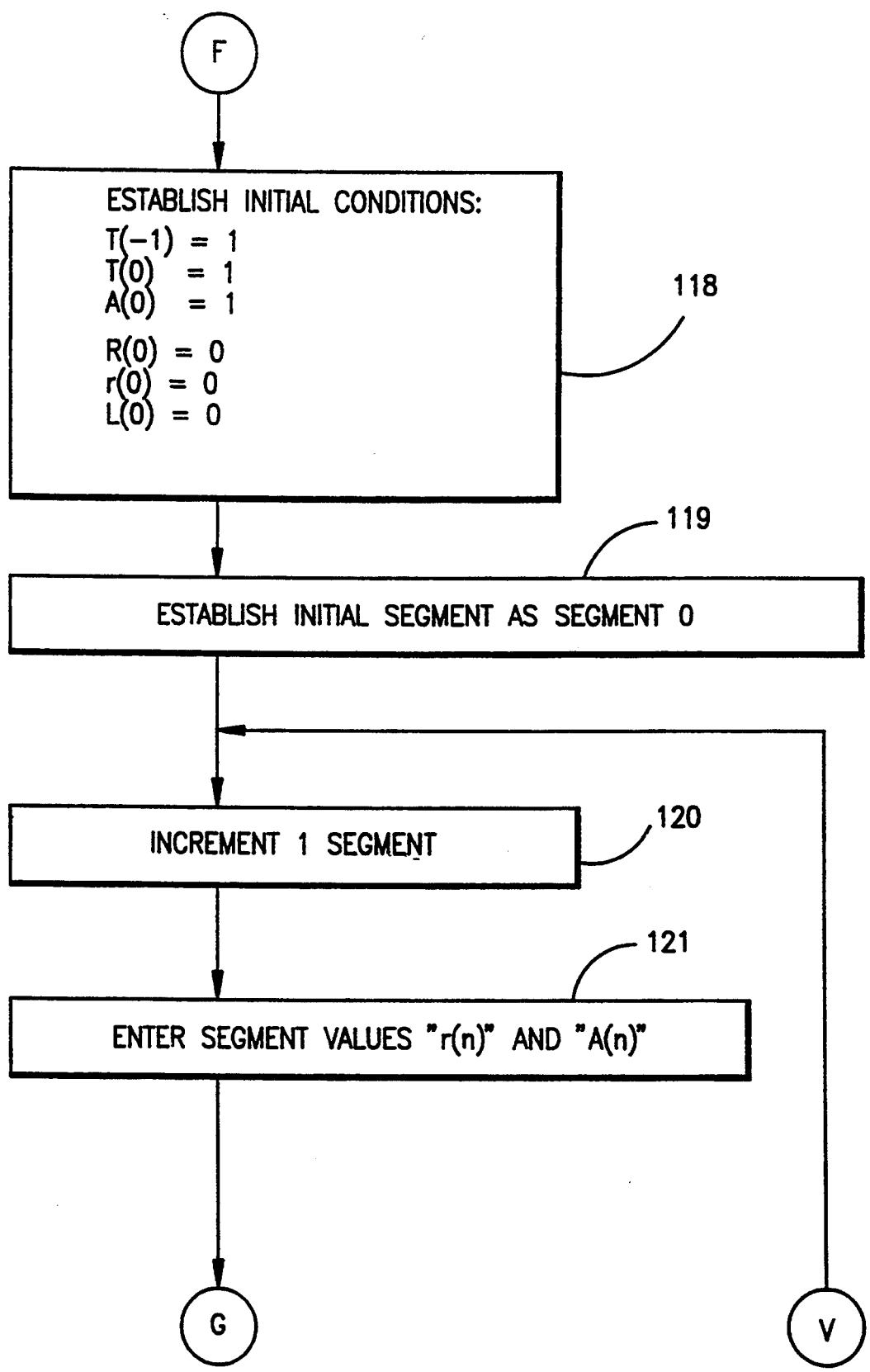
Figure 10:
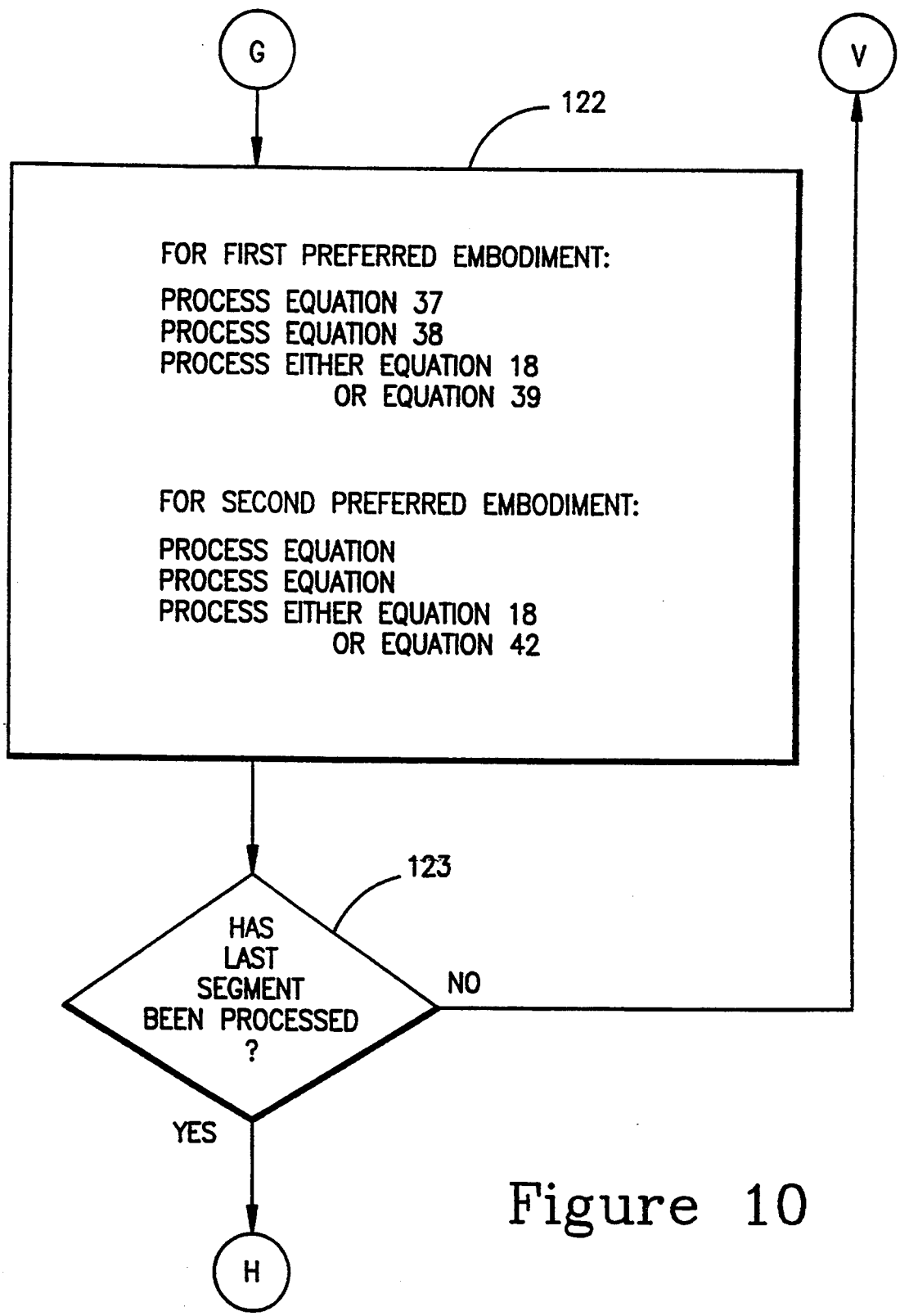

In each embodiment, an iterative calculation procedure may be employed to process the circuit by segments (step 122, shown in FIG. 10), with each segment including one reflection and one attenuation point discontinuity. This is due to the nature of the ladder network, wherein each segment is topically identical and varies only in the numerical value of its discontinuity coefficients. Such an iteration procedure is easily implemented on a computer using the loop shown in steps 120–123 (FIGS. 9 and 10) after initial conditions have been set (steps 118 and 119).

(i) First Preferred Embodiment

Figure 3:
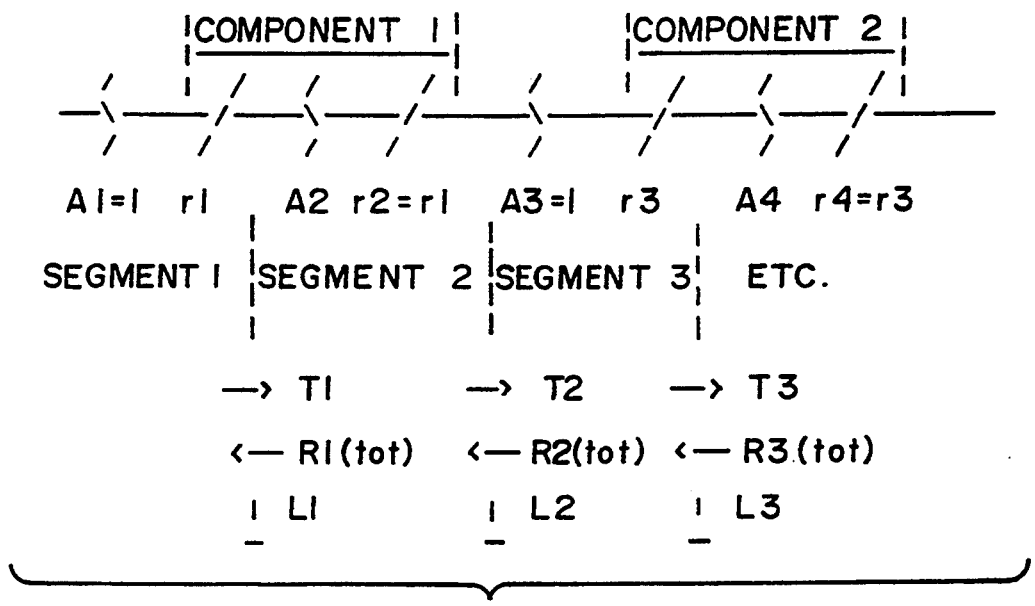
FIG. 3 illustrates a complete two component ladder network according to a first preferred embodiment of the invention, wherein an attenuation element whose value equals 1 is added prior to the first system component.

The model for a ladder network having an attenuation element A1 at the beginning of the microwave circuit is shown in FIG. 3. For segment 1, the two point discontinuities are r=r1, and Av=A1=1. Using the same reasoning that was employed to derive equations (8), (10), and (12) for the situation of three point discontinuities in a component, the following formulas for the respective first transmission, reflection, and loss coefficients T1$^2$, R1$^2$, and L1$^2$ of the network are deduced:

$$T1^2 = A1^2(1 - r1^2) \quad (25)$$

$$R1^2 = r1^2 A1^4 \quad (26)$$

$$L1^2 = (1 - A1^2)(1 + r1^2 A1^2) \quad (27)$$

For the second segment, the reflection coefficient r2 is allowed to interact, through the attenuation coefficient A2, with the previous segment's reflection coefficient r1, to process accurately the infinitely many reflections bouncing between r2 and r1. This formulation of the equations accounts for 'nearest-neighbor' interaction for each subsequent segment processed, and is an iteratively applicable format. The values T2, R2, and L2 are full system-level quantities, not merely segment-level contributions. The infinite order, nearest-neighbor equations for T2, R2, and L2 are shown below:

$$T2^2 = T1^2 * \frac{A2^2(1 - r2^2)}{1 - r1^2 r2^2 A2^4} \quad (28)$$

$$R2^2 = R1^2 + T1^2 * \frac{(1 - r2^2)A1^2 r2^2 A2^4}{1 - r1^2 r2^2 A2^4} \quad (29)$$

$$L2^2 = L1^2 + T1^2 * \frac{(1 - A1^2)(1 + r1^2 A1^2) + ((1 - r1^2) - T1^2) r2^2 A2^4}{1 - r1^2 r2^2 A2^4} \quad (30)$$

For the nth segment, substituting n for 2 and (n−1) for 1 to designate the nth segment and the adjacent (n−1)th segment, the generalized equations are as follows:

$$T(n)^2 = T(n-1)^2 * \frac{A(n)^2(1 - r(n)^2)}{1 - r(n-1)^2 r(n)^2 A(n)^4} \quad (31)$$

$$R(n)^2 = R(n-1)^2 + \quad (32)$$

$$T(n-1)^2 * \frac{(1 - r(n-1)^2)A(n-1)^2 r(n)^2 A(n)^4}{1 - r(n-1)^2 r(n)^2 A(n)^4}$$

$$L(n)^2 = L(n-1)^2 + T(n-1)^2 * \quad (33)$$

$$\frac{(1 - A(n-1)^2)(1 + r(n-1)^2 A(n-1)^2) + ((1 - r(n-1)^2) - T(n-1)^2) r(n)^2 A(n)^4}{1 - r(n-1)^2 r(n)^2 A(n)^4}$$

In order to use the ladder network of FIG. 3, the following steps are preferred:

A. Reflection and attenuation coefficients r and Av for the above-described calculations are obtained by the data gathering steps of either measuring, or using the components' specifications for, the insertion loss and return loss or VSWR of each individual system component, and substituting these values into equations (16)–(18), and then any of the pairs (19) and (20), (21) and (22), or (20) and (22), as described in section II above. These steps are shown in FIGS. 5–8 (steps 100–104, 111 and 116).

B. For cables having different lengths or for different value attenuators, only the lowest loss version of the component is processed to obtain r, after which the attenuation coefficient Av is obtained using equations (23) or (24), the latter for an insertion loss of more than twenty decibels (Steps 105–115).

C. Next, a ladder network is constructed as shown in FIGS. 3 and 8–10 and the respective transmission, reflection, and loss coefficients T(n), R(n), and L(n) are iteratively calculated for each segment using the final form of the general equations (37)–(39), as shown in section V below (Steps 117–123).

Figure 11:
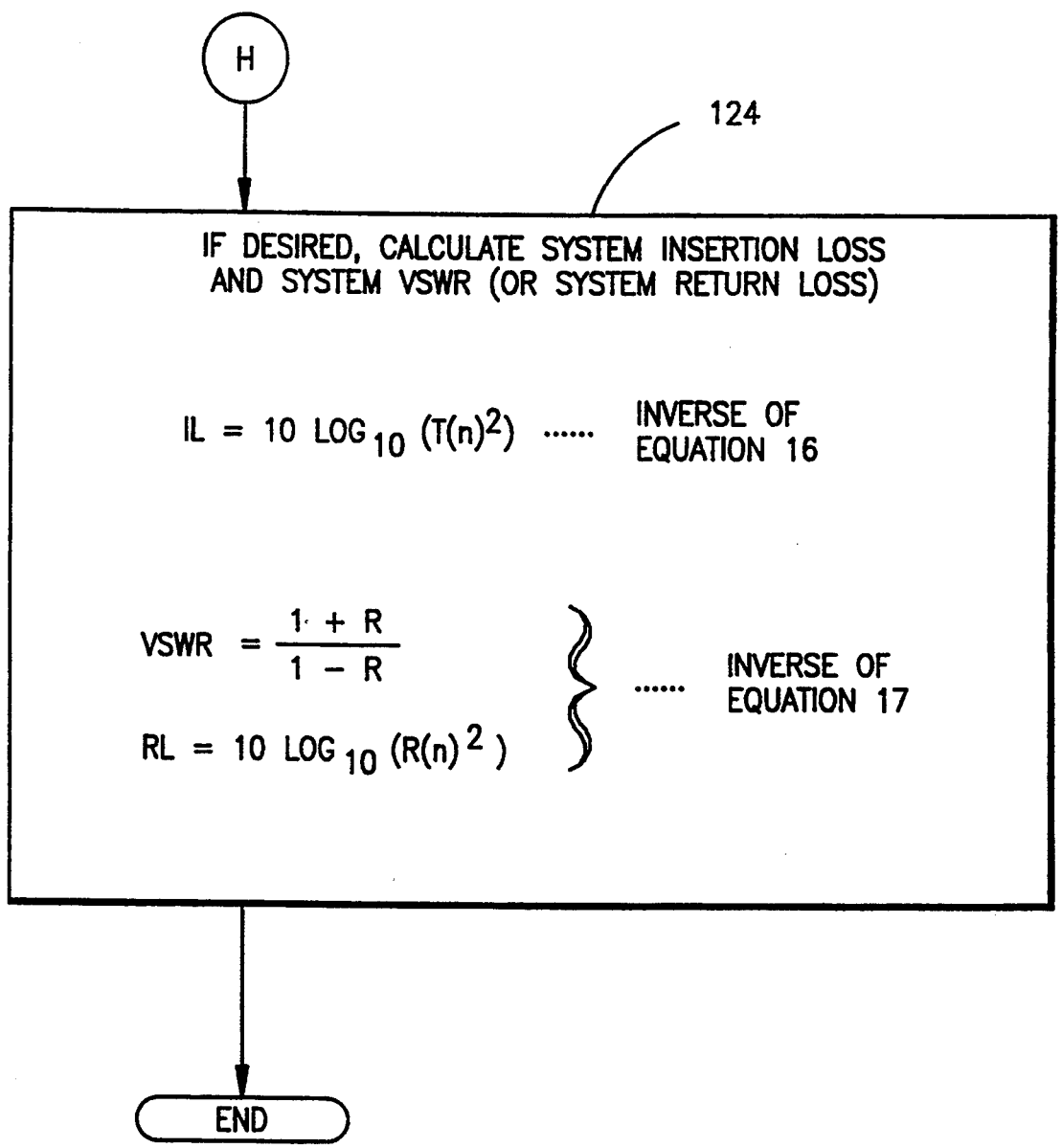

D. Finally, the system insertion loss, VSWR or return loss, and heat loss values can be calculated using equations (16)–(18) for T, R, and L after completing the iteration calculations of T, R, and L for all components in the system (FIG. 11, step 124).

(ii) Second Preferred Embodiment

Figure 4:
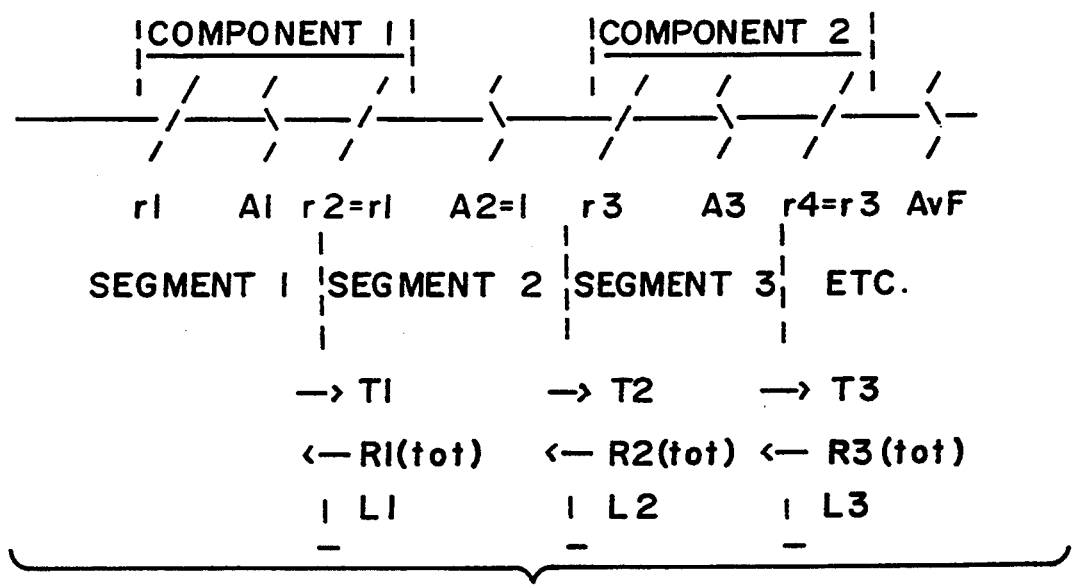
FIG. 4 illustrates a complete two component ladder network according to a second preferred embodiment of the invention, wherein an attenuation element is added after the final system component; and whose value is set equal to 0 for a terminated circuit which returns only a VSWR value, and whose value is set equal to 1 for an unterminated circuit which returns both insertion loss and VSWR values.

A similar analysis for the second embodiment, as illustrated in FIG. 4, gives rise to the following general case equations, applied by working forwards from r(1) to a final artificial attenuation point discontinuity having an attenuation coefficient AvF:

$$T(n)^2 = T(n-1)^2 * \frac{A(n)^2(1 - r(n)^2)}{1 - r(n-1)^2 r(n)^2 A(n-1)^4} \quad (34)$$

$$R(n)^2 = R(n-1)^2 + \quad (35)$$

$$T(n-1)^2 * \frac{(1 - r(n-1)^2)A(n-1)^2 r(n)^2}{1 - r(n-1)^2 r(n)^2 A(n-1)^4}$$

$$L(n)^2 = L(n-1)^2 * \frac{1 + r(n)^2 A(n-1)^2}{1 - r(n-1)^2 r(n)^2 A(n-1)^4} + \quad (36)$$

$$T(n-1)^2 * \frac{(1 - r(n)^2)(1 - A(n)^2)}{1 - r(n-1)^2 r(n)^2 A(n-1)^4}$$

When the final segment is processed in this embodiment, there are two choices for AvF. The first is to set AvF equal to one, which represents an unterminated system and therefore yields both insertion loss and VSWR. The other choice is to set AvF equal to zero, representing perfect termination, and which therefore yields only VSWR because no power is transmitted.

This embodiment is preferred over the first embodiment because this embodiment reflects the physically real situation in which the first element in the circuit is a reflection and the last element may or may not be a load, while the first embodiment begins with a non-realistic attenuation and ends with a reflection which is realistic for an unterminated circuit, but must be set to zero and is therefore superfluous for a circuit terminated with a load.

In order to use the ladder network of FIG. 4, the same steps A–D as were used in connection with the first preferred embodiment are used except that they are implemented by utilizing equations (40)–(42), as shown in section V below. Both preferred networks are based on the following analytical construct:

By introducing an attenuation element whose value equals one between components, the two sets of general case equations provide for the interaction of two reflection points in intimate contact with no attenuation in between, as is the case when the circuit components are connected to each other.

It may be helpful to view the two reflection points as partially silvered mirrors facing each other and reflecting off each other, in which case it will be recognized that the above equations quantify the amount of power that becomes physically trapped between the two reflection points. This is accomplished by placing the attenuation element whose value is 1 between the contiguous reflection points.

V. Correction for System Isolation

The contribution of each reflection point r(n) in a system to the overall system reflection R(n) is reduced beyond nearest-neighbor interaction because of the isolation provided by the loss in the circuitry preceding the nearest neighbor. The equations as expressed so far will yield a larger overall reflection and a smaller overall loss than actually occurs.

This situation is easily corrected by multiplying each new contribution to the overall reflection by the power transmission coefficient of the circuitry preceding its nearest neighbor, $T(n-2)^2$ and conserving power in the loss equation. The final version of the generalized iteration equations is shown below, for both preferred embodiments.

(i) First Preferred Embodiment

The model for a ladder network having an attenuation element A1 at the beginning of the microwave circuit is shown in FIG. 3.

$$T(n)^2 = T(n-1)^2 * \frac{A(n)^2(1 - r(n)^2)}{1 - r(n-1)^2 r(n)^2 A(n)^4} \quad (37)$$

$$R(n)^2 = R(n-1)^2 + \quad (38)$$

$$T(n-1)^2 * \frac{(1 - r(n-1)^2)A(n-1)^2 r(n)^2 A(n)^4}{1 - r(n-1)^2 r(n)^2 A(n)^4} * T(n-2)^2$$

$$L(n)^2 = L(n-1)^2 + \quad (39)$$

-continued $$T(n-1)^2 * \frac{(1 - A(n-1)^2)(1 + r(n-1)^2 A(n-1)^2) + ((1 - r(n-1)^2) - T(n-1)^2)r(n)^2 A(n)^4}{1 - r(n-1)^2 r(n)^2 A(n)^4} +$$

$$T(n-1)^2 * \frac{(1 - r(n-1)^2)A(n-1)^2 r(n)^2 A(n)^4}{1 - r(n-1)^2 r(n)^2 A(n)^4} * (1 - T(n-2)^2)$$

(ii) Second Preferred Embodiment

The model for a ladder network having an attenuation element AvF at the end of the microwave circuit is shown in FIG. 4.

$$T(n)^2 = T(n-1)^2 * \frac{A(n)^2(1 - r(n)^2)}{1 - r(n-1)^2 r(n)^2 A(n-1)^4} \quad (40)$$

$$R(n)^2 = R(n-1)^2 + \quad (41)$$

$$T(n-1)^2 * \frac{(1 - r(n-1)^2)A(n-1)^2 r(n)^2}{1 - r(n-1)^2 r(n)^2 A(n-1)^4} * T(n-2)^2$$

$$L(n)^2 = L(n-1)^2 * \frac{1 + r(n)^2 A(n-1)^2}{1 - r(n-1)^2 r(n)^2 A(n-1)^4} + \quad (42)$$

$$T(n-1)^2 * \frac{(1 - r(n)^2)(1 - A(n)^2)}{1 - r(n-1)^2 r(n)^2 A(n-1)^4} +$$

$$T(n-1)^2 * \frac{(1 - r(n-1)^2)A(n-1)^2 r(n)^2}{1 - r(n-1)^2 r(n)^2 A(n-1)^4} * (1 - T(n-2)^2)$$

The transmission coefficient $T(n)^2$ is not affected by this correction because it is totally multiplicative, making it independent of the spatial distribution of high and low reflection or high and low attenuation elements. It is this attribute that makes the transmission coefficient useful as the correction factor. This spatial independence also indicates why the technique of adding component insertion loss values is directionless with respect to flow of power.

Mathematically, the multiplication of numbers corresponds to the addition of the logarithms of those numbers. The insertion loss is proportional to the logarithm of the transmission coefficient. The conventional technique of adding the component insertion loss values in decibels is analogous to this method's process of multiplying transmission coefficients, and therefore correctly yields the expected system insertion loss.

As is apparent from the generalized equations, the reflection and loss coefficients R and L contain additive terms, causing them to be dependent upon the layout of the high and low reflection and attenuation elements. However, because of the conservation of power principal and the spatial independence of the transmission coefficient T discussed above, the sum of the squares of the reflection and loss coefficients is independent of the layout of the high and low reflection and high and low attenuation elements.

VI. Implementation

Although the method described above does not inherently require use of a computer, the computations required may be greatly facilitated if a computer is used. A wide variety of programs will occur to those skilled in the art for practicing the invention, although the following is preferred: First, calculate $R(n)^2$ and $T(n)^2$ via the generalized iteration equations above, and then calculate $L(n)^2$ by using the conservation of power formula, i.e., $L(n)^2 = 1 - (R(n)^2 + T(n)^2)$. This sequence of calculations accomplishes two purposes. First it significantly simplifies the calculation programming because the most complicated equation need not be programmed explicitly. Second it ensures that at all times the conservation of power principal is observed precisely, even if there are minor inaccuracies in the calculation of either of the constituent values, R and T.

When writing the program, the initial conditions $T(-1)$, $T(0)$, and $A(0)$ must be set to 1, indicating complete transmission prior to the first segment and no attenuation prior to the first segment. $R(0)$, $r(0)$, and $L(0)$ are set to zero indicating no reflection and no heat loss prior to the first segment. Both of these initial steps are part of step 118, shown in FIG. 9. These initial conditions define the situation in such a way that a computer program can commence its calculations autonomously and unambiguously, for any implementation of the generalized iteration equations.

In view of the above description, it will occur to those skilled in the art that modifications of the described exemplary embodiments are possible, and consequently, it is intended that the scope of the invention shall be limited solely by the appended claims, which follow.

What is claimed is:

1. A method of providing data and analyzing the data in order to determine the overall Dower response of a microwave system, comprising the steps of gathering the data and analyzing the data, wherein the step of gathering data comprises the steps of:

(A) providing first, second, and third individual microwave components each possessing an insertion loss, a return loss, and a voltage standing wave ratio (VSWR);

(B) establishing an order of said first, second, and third individual microwave components;

(C) measuring said insertion loss and also measuring one of said VSWR and return loss of said first, second, and third individual microwave components;

(D) modifying said order of said first, second, and third individual microwave components depending on results Obtained by said step of measuring the insertion loss and one of said VSWR and return loss of said first, second, and third individual microwave components; and measuring at least two third individual microwave component physical characteristics representative of the amount by which power to the third individual microwave component is lost, reflected, and transmitted;

(f) deriving, using a computer, from said third individual microwave component factors $T^2$, $R^2$, and $L^2$, reflection point coefficients $r^2$ and attention point coefficient $Av^2$ for said third individual microwave component;

(g) constructing an iterative ladder network which represents the first, second, and third individual microwave components, in the selected order, as made up of a sequence of segments, each segment being represented by an nth one of said reflection point coefficients $r(n^2)$ and an nth one of said attenuation point coefficients $A(n)^2$, where n designates the number of the segment in the sequence;

(h) processing, using a computer, the reflected coefficients $r(n)^2$ for each segment and the attenuation coefficients $A(n)^2$ for each segment in order in the direction of power flow, to obtain a system power transmission factor $T(n)^2$ and a system power reflection factor $R(n)^2$ which accounts for the first n segments of the system;

(i) comparing the system power transmission factor and power reflection factor with a predetermined power transmission factor and a predetermined power reflection factor; and (j) if the difference between respective system and predetermined factors is not acceptable, repeating at least steps (a)–(i) for a different first individual microwave component.

2. A method as claimed in claim 1, wherein step (d) further comprises the step of obtaining a system power loss factor $L(n)^2$ which accounts for the first n components of the system.

3. A method as claimed in claim 2, wherein said step of obtaining a loss factor is accomplished by using the conservation of power formula $L(n)^2 = 1 - T(n)^2 - R(n)^2$.

4. A method as claimed in claim 1, wherein step (d) comprises the steps of:

(i) calculating a first iterative system level transmission coefficient $T(1)$ and a first iterative system level reflection coefficient $R(1)$ as a function of $r(1)$ and $A(1)$, wherein $r(1)$ is the input reflection point coefficient for the first component and $A(1)$ is an artificial attenuation point coefficient placed at the input of the first component, the value of $A(1)$ being set equal to 1;

(ii) calculating a second iterative system level transmission coefficient $T(2)$ and a second iterative system level reflection coefficient $R(2)$ as a function of $r(2)$ and $A(2)$, wherein $r(2)$ is the output reflection coefficient of the first component, assumed to be equal to $r(1)$, and $A(2)$ is the attenuation coefficient for the first component;

(iii) repeating steps (i) and (ii) for each component in the system by calculating the nth iterative system power transmission factor $T(n)^2$ and the nth iterative system power reflection factor $R(n)^2$.

5. A method as claimed in claim 4, wherein $A(n) = 1$ for $n =$ an odd number.

6. A method as claimed in claim 4, wherein the nth iterative reflection contribution to the system reflection factor $R(n)$ is multiplied by the second previous power transmission factor $T(n-2)^2$ prior to its inclusion in $R(n)$.

7. A method as claimed in claim 4, wherein an iterative system loss factor $L(n)$ is calculated each time step (d) is performed, which contains as part of the contribution from the nth iterative segment the nth iterative reflection contribution to the system reflection factor $R(n)$, multiplied by $(1 - T(n-2)^2)$.

8. A method as claimed in claim 4, wherein the nth iterative transmission factor is calculated according to the formula:

$$T(n)^2 = T(n-1)^2 * \frac{A(n)^2(1 - r(n)^2)}{1 - r(n-1)^2 r(n)^2 A(n)^4}.$$

9. A method as claimed in claim 4, wherein the nth iterative reflection factor is calculated according to the formula:

$$R(n)^2 = R(n-1)^2 +$$

$$T(n-1)^2 * \frac{(1 - r(n-1)^2)A(n-1)^2 r(n)^2 A(n)^4}{1 - r(n-1)^2 r(n)^2 A(n)^4} * T(n-2)^2.$$

10. A method as claimed in claim 4, wherein an iterative loss factor is calculated each time step (d) is performed, according to the formula:

$$L(n)^2 = L(n-1)^2 + T(n-1)^2 *$$

$$\frac{(1 - A(n-1)^2)(1 + r(n-1)^2 A(n-1)^2) + ((1 - r(n-1)^2) - T(n-1)^2)r(n)^2 A(n)^4}{1 - r(n-1)^2 r(n)^2 A(n)^4} +$$

$$T(n-1)^2 *$$

$$\frac{(1 - r(n-1)^2)A(n-1)^2 r(n)^2 A(n)^4}{1 - r(n-1)^2 r(n)^2 A(n)^4} * (1 - T(n-2)^2).$$

11. A method as claimed in claim 1, wherein step (d) comprises the steps of:
  (i) calculating a first iterative system level transmission coefficient T(1) and a first iterative system level reflection coefficient R(1) as a function of r(1) and A(1), wherein r(1) is the input reflection point coefficient for the first component and A(1) is the attenuation point coefficient for the first component;
  (ii) calculating a second iterative system level transmission coefficient T(2) and a second iterative system level reflection coefficient R(2) as a function of r(2) and A(2), wherein r(2) is the output reflection coefficient of the first component assumed to be equal to r(1) and A(2) is an artificial attenuation coefficient placed at the output of the first component, the value of A(2) being set equal to 1; and
  (iii) repeating steps (i) and (ii) for each component in the system by calculating the nth iterative transmission factor $T(n)^2$ and the nth iterative reflection factor $R(n)^2$.

12. A method as claimed in claim 11, wherein A(n)=1 for n=an even number.

13. A method as claimed in claim 11, wherein the nth iterative reflection contribution to the system reflection factor R(n) is multiplied by the second previous power transmission factor $T(n-2)^2$ prior to its inclusion in R(n).

14. A method as claimed in claim 11, wherein an iterative system loss factor L(n) is calculated each time step (d) is performed, which contains as part of [the]a contribution to L(n) from the nth iterative segment the nth iterative reflection contribution to the system reflection factor R(n), multiplied by $(1-T(n-2)^2)$.

15. A method as claimed in claim 11, wherein the nth iterative transmission factor is calculated according to the formula:

$$T(n)^2 = T(n-1)^2 * \frac{A(n)^2 (1 - r(n)^2)}{1 - r(n-1)^2 r(n)^2 A(n-1)^4}.$$

16. A method as claimed in claim 11, wherein the nth iterative reflection factor is calculated according to the formula:

$$R(n)^2 = R(n-1)^2 +$$

$$T(n-1)^2 * \frac{(1 - r(n-1)^2)A(n-1)^2 r(n)^2}{1 - r(n-1)^2 r(n)^2 A(n-1)^4} * T(n-2)^2.$$

17. A method as claimed in claim 11, wherein an iterative loss factor is calculated each time step (d) is performed, according to the formula:

$$L(n)^2 = L(n-1)^2 * \frac{1 + r(n)^2 A(n-1)^2}{1 - r(n-1)^2 r(n)^2 A(n-1)^4} +$$

$$T(n-1)^2 * \frac{(1 - r(n)^2)(1 - A(n)^2)}{1 - r(n-1)^2 r(n)^2 A(n-1)^4} + T(n-1)^2 *$$

$$\frac{(1 - r(n-1)^2)A(n-1)^2 r(n)^2}{1 - r(n-1)^2 r(n)^2 A(n-1)^4} * (1 - T(n-2)^2).$$

18. A method as claimed in claim 4, or claim 11, wherein the input and output reflection coefficients for each component are assumed to be equal.

19. A method as claimed in claim 1, wherein step (a) further comprises the steps of calculating T, R, and L for each component according to the following relationships:

$$T = 10^{IL/20}$$

$$R = \frac{VSWR - 1}{VSWR + 1}$$

$$L = SQRT(1 - (T^2 + R^2)).$$

20. A method as claimed in claim 1, wherein step (a) further comprises the steps of calculating R, T, and L according to the following relationships:

$$T = 10^{IL/20}$$

$$R = 10^{RL/20}$$

$$L = SQRT(1-(T^2+R^2)).$$

21. A method as claimed in claim 1, wherein step (b) comprises the steps of deriving r according to the following formula:

$$r^2 = \frac{(2 - 2L^2T^2 - L^4) - SQRT((2 - 2L^2T^2 - L^4)^2 - 4R^2(2 - R^2))}{2(2 - R^2)}.$$

22. A method as claimed in claim 21, wherein Av is determined according to the following formula:

$$Av^2 = \frac{1 - r^2 - L^2}{1 - r^2 - r^2 L^2}.$$

23. A method as claimed in claim 1, wherein step (b) comprises the step-s of deriving r according to the following formula:

$$r^2 = \frac{1 - Av^2 - L^2}{1 - Av^2 - Av^2 L^2}.$$

24. A method as claimed in claim 21 or claim 23, wherein Av is determined according to the following formula:

$$Av^2 = \frac{(2L^2T^2 + L^4) - SQRT((2L^2T^2 + L^4)^2 + 4T^4)}{-2T^2}.$$

25. A method as claimed in claim 21 or claim 23, wherein step (b) further comprises the steps of determining $r^2$ for a lowest loss attenuator or a shortest cable, and using those values of $r^2$ to determine $Av^2$ according to the following formula:

$$Av^2 = \frac{-(1-r^2)^2 + SQRT((1-r^2)^4 + 4r^4T^4)}{2r^4T^2}.$$

26. A method as claimed in claim 21 or claim 23, wherein step (b) further comprises the steps of determining $r^2$ for the lowest loss attenuator and shortest cable and using those values of r to determine Av according to the following formula:

$$Av = \frac{T}{1-r^2}$$

when T is less than 0.1.

27. A method as claimed in claim 1, wherein step (c) further comprises the step of constructing the first segment from an artificial attenuation coefficient having a value of 1 and from an input reflection coefficient of the first component in the sequence.

28. A method as claimed in claim 27, wherein step (c) further comprises the step of constructing the second segment from an attenuation coefficient and an output reflection coefficient of the first component.

29. A method as claimed in claim 1, wherein step (c) further comprises the step of constructing the last segment of the ladder network from an output reflection coefficient of the last component in the sequence and from an artificial attenuation coefficient having a value of 1.

30. A method as claimed in claim 1, wherein step (c) further comprises the step of constructing the last segment of the ladder network from an output reflection coefficient of the last component in the sequence and from an artificial attenuation coefficient having a value of zero.

31. A method of providing data for an algorithm which determines the overall power response of a microwave system, comprising the steps of:
 a) providing first, second, and third individual microwave components each possessing an insertion loss and a voltage standing wave ratio (VWR);
 b) establishing an order of said first, second, and third individual microwave components:
 c) measuring said insertion loss and VSWR of said first, second, and third individual microwave components;
 d) modifying said order of said first, second, and third individual microwave components depending on results obtained in said step of measuring the insertion loss and VSWR of said first, second, and third individual microwave components; and
 (e) determining a direction of power flow for the first, second, and third individual microwave components in aid order.

* * * * *